United States Patent [19]
Murphy et al.

[11] Patent Number: 5,189,571
[45] Date of Patent: Feb. 23, 1993

[54] ADAPTIVE SETTLE TIME MINIMIZATION FOR A HARD DISK DRIVE

[75] Inventors: Robert D. Murphy, Yukon; Stephen R. Genheimer, Mustang, both of Okla.

[73] Assignee: Seagate Technology, Inc., Scotts Valley, Calif.

[21] Appl. No.: 524,190

[22] Filed: Apr. 30, 1990

[51] Int. Cl.$^5$ .................... G11B 21/02; G11B 5/55
[52] U.S. Cl. .................... 360/75; 360/78.04; 360/78.07; 369/32
[58] Field of Search .................. 360/78.04–78.14, 360/75; 369/32, 33, 41; 318/561

[56] References Cited

U.S. PATENT DOCUMENTS

| | | |
|---|---|---|
| 3,893,180 | 7/1975 | Braun et al. |
| 4,092,682 | 5/1978 | Andrews, Jr. et al. |
| 4,314,291 | 2/1982 | Oda et al. |
| 4,331,987 | 5/1982 | Oda et al. |
| 4,480,217 | 10/1984 | Robbins et al. |
| 4,551,776 | 11/1985 | Roalson. |
| 4,669,004 | 5/1987 | Moon et al. |
| 4,835,633 | 5/1989 | Edel et al. ............... 360/78.04 |
| 4,908,561 | 3/1990 | Hashimoto ............... 360/78.07 |
| 5,003,415 | 3/1991 | Freeze ..................... 360/78.06 |
| 5,063,454 | 11/1991 | Hashimoto ............... 360/78.04 |

Primary Examiner—Jerry Smith
Assistant Examiner—Steven R. Garland
Attorney, Agent, or Firm—Edward P. Heller, III; Bill D. McCarthy; Louis W. Watson

[57] ABSTRACT

A method for optimizing settle characteristics of a read/write head on a data track on a rotating disk of a hard disk drive following a seek to the data track wherein each data track is assigned to a selected on of a plurality of concentric zones defined on the surface of the disk. Seeks are performed by a servo system in relation to a compensated velocity demand profile that provides velocities the head is to have at selected distances from a destination track and is selected for each zone by adding a velocity increment specific to the zone to a stored velocity demand profile for movement of the head in one direction and subtracted from the stored velocity demand profile for movement in the opposite direction. The velocity increment is selected to cause oppositely directed movements of the head in each zone for a selected demand velocity taken from the stored velocity demand profile to occur at equal speeds when added to the selected demand velocity for movement in one direction and subtracted from the selected demand velocity for movement in the opposite direction. The servo AGC is adjusted for each zone to cause the average of actual velocities of head movement in opposite directions to be equal to the selected demand velocity.

14 Claims, 3 Drawing Sheets

ADAPTIVE SETTLE TIME MINIMIZATION FOR A HARD DISK DRIVE

BACKGROUND OF THE INVENTION

1. Field of the Invention

The present invention relates generally to improvements in servo methods, and, more particularly, but not by way of limitation to improvements in servo methods for effecting seeks between data tracks on disks of hard disk drives.

2. Brief Description of the Prior Art

A peripheral commonly used with a computer is a hard disk drive in which data generated by the computer is stored on concentric tracks defined in magnetic coatings formed on metallic disks. The rigidity of the disks permits the data tracks to be closely spaced so that the hard disk drive is capable of storing large amounts of information. Because of this capacity, the hard disk drive is becoming increasingly popular with computer users. Data is written to or read from a selected track by read/write heads that are supported by a pivotable actuator adjacent the disk stack so that the heads can be moved across the disks by a passing a current through a coil, immersed in a magnetic field, at the end of the actuator opposite the heads.

In order to carry out the storage of data to a selected track of a disk, it is necessary to move a read/write head that writes the data to the track and, similarly, it is necessary to move the read/write head to a track whereon data has been previously stored to read such data. For these purposes, the hard disk drive is provided with a servo circuit that reads a servo pattern in the data tracks or on a dedicated servo surface and responds, in a seek mode of operation of the servo system, to effect the movement to the track. Often, the response is carried out by using the servo pattern to generate a position error signal, indicative of the location of the head which reads the pattern, referred to as the servo head, with respect to the centers of the tracks, differentiating the position error signals to obtain a signal proportional to the radial velocity of the servo head across the disk, and comparing the actual velocities of the servo head with velocities stored as a velocity demand profile in a look up table in microprocessor. If the actual velocity at a given distance from the destination track is lower than the velocity taken from the velocity demand profile for that distance, a correction signal is generated and transmitted to a power amplifier which passes a current through the actuator coil in a direction that will tend to accelerate the heads across the disks. Conversely, if the actual velocity of the servo head is greater than the demand velocity for a given servo head location, the current passed through the actuator coil will be in a direction to decelerate the servo head. By designing the velocity demand profile to demand large servo head velocities at large distances from a destination track and to demand steadily decreasing velocities as the servo head approaches the destination track, the servo head can be caused to have a large acceleration at the start of a seek and a deceleration near the end of the seek that will ideally cause the head to arrive at the track with a velocity that will cause the head to rapidly settle on the track when the servo circuit undergoes a transition to a track following mode of operation in which the servo head is maintained in alignment with the track by control signals generated in proportion to the position error signal, and the integral thereof, and transmitted to the power amplifier.

In practice, this ideal has not been hitherto achieved. In particular, bias forces are exerted on the heads by air swirling about the disk surfaces and by electrical leads by means of which electrical connections are made to the heads with the result that the acceleration and deceleration of the the heads will not be proportional to the difference in the demand and actual velocities of the heads across the disk. Moreover, electronic offsets similarly affect the relationship between head acceleration and deceleration and the difference in actual and demand velocities. As a result, the heads do not follow the velocity demand profile and, accordingly, can arrive at the destination track with an excessive speed that causes overshoot of the track or with an insufficient speed that can cause the head to stall before reaching the track. In either case, time is consumed in settling of the head on the track sufficiently that reading from or writing to the track can be commenced. The net result is a loss of throughput of the hard disk drive; that is, the average rate at which data can be stored or retrieved by the computer with which the hard disk drive is used.

A second effect that results in the loss of throughput is bit crowding that occurs at inside tracks on the disk surface that is used in servoing. In many cases, it will be desirable to adjust the gain of the servo loop by providing an AGC circuit that responds to dibits of the servo pattern that are geometrically equivalent from one track to another so that, ideally, measurement of signals produced in the servo head by such dibits will provide a constant amplitude signal that can be used to AGC the loop gain. In practice, a geometrical equivalence of dibits of the servo pattern cannot be maintained because of the decreasing circumferences of the tracks from the edge of the disk toward the center thereof. As a result, signals generated in the servo head as dibits of the servo pattern pass thereunder can superimpose to cause the amplitudes of the signals to differ from the amplitudes of signals that would be produced by isolated servo pattern dibits. Moreover, because of the variation of the track circumferences with radius, the degree of superposition will vary from one track to another. The net result is that a loop gain that is appropriate for one track is not appropriate for other tracks. Thus, if an average loop gain is used for effecting seeks, the differentiated position error signals, to which signals corresponding to the demand velocities taken from the velocity demand profile are compared, will not be representative of the actual velocity of the servo head. Again, long settling times for the head on a destination track can result to lower data throughput.

SUMMARY OF THE INVENTION

The present invention solves the problems described above by providing a method for adjusting both the loop gain and velocity demand profile adaptively so that the differentiated position error signals to which demand velocity signals are compared are representative of the actual velocity of the servo head near the destination track and the velocity demand profile takes the bias forces into account to provide an appropriate velocity demand profile to be compared with actual head velocities.

To the first of these ends, the tracks on the surface whereon the servo pattern is written are assigned to a series of concentric zones and a loop gain is developed and stored for each of the zones to be used in making seeks to tracks in such zone. In particular, an average loop gain is first determined by programming the microprocessor to call for long sweeps back and forth across the disk as part of the start up procedure for the hard disk drive. The demand velocity for such sweeps is selected to be substantially the maximum speed the servo head is to have during a seek and the actual average speed, as determined by differentiating the position error signals, is measured by determining the time required for the head to cross a selected number of tracks. The average loop gain, expressed as an AGC reference level, is then selected so that the average velocity for such sweeps equals the maximum speed called for by the microprocessor. Thereafter, the servo head is moved to each zone in turn and low speed sweeps are made in opposite directions to determine an AGC correction that will cause the average of the actual velocities for two oppositely directed sweeps to be same as the demand velocity called for to effect the sweeps. Again, the actual velocities are measured by measuring the time for the head to traverse a selected number of tracks. The AGC corrections are then saved in a look up table and the average AGC level is adjusted, by adding the correction each time a seek is made to a track in the zone for which the correction is determined.

For adjustment of the profile, the disk is again zoned, and low speed sweeps in opposite directions are made in each zone for a selected demand velocity taken from the velocity demand profile. During such sweeps, the actual head velocities are measured as described above. The demand velocities for such sweeps are then adjusted, by incrementing the demand velocity for movement in one direction and equally decrementing the demand velocity for movement in the other direction to obtain a velocity increment which, when added to the demand profile velocity during movement of the servo head in one direction and subtracted from such demand velocity during movement in the other direction, will cause equal actual velocities for the two directions. The velocity increments are stored in relation to the zones and, thereafter, each time a seek is made to a track in a selected zone, the seek is carried out with respect to a compensated velocity derived from the stored velocity demand profile by adding the velocity increment to at least portions of the stored profile for seeks in one direction to tracks in the selected zone and subtracting the velocity increment from corresponding portions of the stored profile for seeks in the opposite direction to a track in the selected zone.

An object of the present invention is to optimize the time for magnetic heads of a hard disk drive to settle on tracks of disks of the drive following seeks to the tracks.

Another object of the invention is to provide a method that compensates for bias forces on the actuator of a hard disk drive and electronics offsets during seeks to tracks on disks of the drive.

Yet another object of the invention is to provide a method for compensating AGC error arising from crowding of servo pattern dibits on a disk of a hard disk drive and from forward gain variations due to such variation as torque constant non-linearities.

Other objects, features and advantages of the present invention will become apparent from the following detailed description when read in conjunction with the drawings and appended claims.

DESCRIPTION OF THE SERVO SYSTEM

Figure 1:
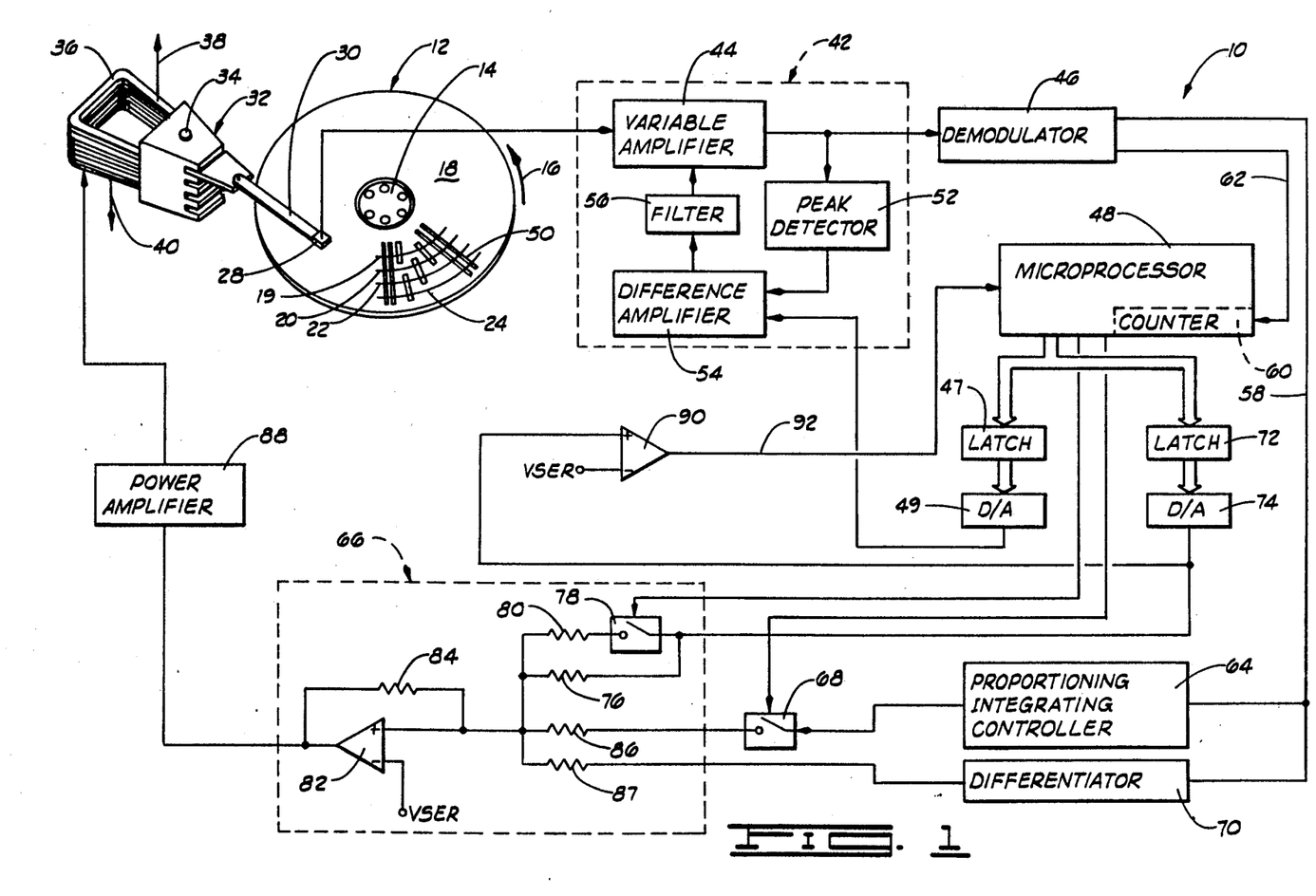
FIG. 1 is a schematic diagram of the servo circuit of a rotating disk data storage device in which the method of the present invention can be practiced.

In order to provide a basis for discussing the method of the present invention, FIG. 1 has been included to generally illustrate the construction of a typical servo circuit, designated by the numeral 10, for a rotating disk data storage device. As illustrated therein, the servo circuit 10 is comprised of a plurality of disks, only one of which has been shown in FIG. 1 and designated by the numeral 12 therein, that are coaxially mounted on a spindle 14 for rotation in a direction indicated at 16. As is known in the art, the disk surfaces, such as the surface 18 of the disk 12, are provided with magnetized coatings so that information can be written along concentric tracks, such as the tracks 19, 20, 22 and 24 that have been partially illustrated on the surface 18, by magnetizing consecutive segments along the tracks in opposite directions using a conventional magnetic head 28 that receives an electrical current from a conventional read/write circuit (not shown). Thus, by varying the direction of the current as the disk 12 rotates, consecutive segments of a track are magnetized in opposite directions to record the information that is contained in the series of current reversals through the head 28. Subsequently, the information is read by detecting the magnetic reversals occurring along a selected track.

For purposes of illustration, the circuit 10 has been drawn for the case in which the surface 18 of the disk 12 is a dedicated servo surface containing only servo information that is used by the servo circuit 10 to move the head 28 from one track to another, in a seek mode of operation of the servo circuit 10, and to maintain the head 28 in radial alignment with a selected track, in a track following mode of operation of the circuit 10, once such a move has been accomplished. However, it will be clear to those skilled in the art that the present invention is not limited to the use of a dedicated servo surface for carrying out these operations. Thus, it is contemplated that the circuit 10 can be of the embedded servo type wherein servo information is interspersed with data that is stored on tracks of the disks.

In keeping with the assumption that the surface 18 is a dedicated servo surface, information on the surface 18 of the disk 12 will take the form of a servo pattern comprised of magnetized dibits that are positioned both radially and circumferentially to cause generation in the servo head 28 of signals that depend on both the radial and circumferential locations of the head with respect to the tracks as the disk 12 rotates. A suitable pattern of dibits and the manner in which the dibits are utilized to generate servo signals has been described in U.S. Pat. No. 4,811,135 issued Mar. 7, 1989 to Donald W. Janz, the teachings of which are incorporated herein by reference.

The head 28 is supported adjacent the surface 18 of the disk 12 by an arm 30 of an actuator 32 that is mounted on a spindle 34 so that pivotation of the actuator will cause radial movement of the head 28 across the disk 12. Such pivotation is effected by passing an electrical current through a coil 36 mounted on the end of the actuator 32 opposite the end whereon the head 28 is mounted. Permanent magnets (not shown) are positioned about the coil 36 to immerse opposite sides of the coil 36 in oppositely directed magnetic fields, indicated by the arrows 38 and 40, so that passage of a current through the coil 36 in one direction will move the head 28 radially outwardly while passage of a current through the coil 36 in the opposite direction will move the head 28 radially inwardly.

Signals generated in the head 28 are transmitted to an AGC circuit 42 which is comprised of a variable amplifier 44 through which the signals are passed to a demodulator 46 which generates position error and track crossing signals used to position the head 28 as will be discussed below. In the present invention, it is contemplated that the AGC circuit 42 is of the type wherein the gain of the amplifier 44 is varied by continuously comparing the maximum amplitude of the signal at the output of the amplifier 44 to a reference signal supplied by a microprocessor 48, via a latch 47 and D/A converter 49, of which the circuit 10 is comprised. Consistently with this AGC approach, the dibits written to the disk surface 18 include radially overlapping elements that form spokes 50 extending across all tracks on the disk so that, in principle, pulses having the same amplitude for all tracks on the disk will be generated in the head 28 each time a spoke passes under the head 28 and, further, other pulses generated by the head 28 will have amplitudes no larger the amplitudes of the signals corresponding to the spokes. In such an AGC circuit, a substantially constant signal for comparison with the AGC reference signal can be generated by a peak detector 52 connected to the output of the variable amplifier 44. The output of the peak detector 52 is connected to one input of a difference amplifier 54, the other input of which receives the reference signal from the microprocessor 48, and the output of the amplifier 54 is passed to a gain control terminal of the variable amplifier 44 via a low pass filter 56 that removes a.c. components of the output signal from the difference amplifier 54.

As described in the aforementioned U.S. Pat. No. 4,811,135 the servo pattern shown therein and illustrated in part on the surface 18, defines a fine control region about each track on the surface 18 extending from the midpoints between such track and each of the tracks adjacent thereto. In such region, for each track, the demodulator 46 responds to signals received from the variable amplifier 44 by providing a position error signal, on a conducting path 58, that has an amplitude proportional to the offset of the center of the head 28 from the center of the track associated with the region. The position error signal is measured from a servo ground VSER which is held a selected voltage level above a circuit ground established by a power supply (not shown) and can conveniently be provided by a voltage regulator (not shown) connected across the power supply. Additionally, the demodulator 46 senses the timing of pulses generated in the head 28 by passage of edges of the servo pattern on the disk surface 18 under the head 28 and provides the downgoing edge of a square pulse each time the head 28 passes from a fine control region about one track to the fine control region about an adjacent track. (The geometry of the pattern that will result in the appropriate timing has been shown in the aforementioned U.S. Pat. No. 4,811,135.) These pulses, referred to herein as track crossing signals, are provided to a clock terminal of a counter 60 included in the microprocessor 48 on a conducting path 62 so that, during a seek operation, the number of tracks remaining to completion of the seek may be continuously maintained in the counter 60 by entering the two's complement of the number of tracks the head is to be moved and subsequently clocking the counter 60 with the track crossing signals. The direction of movement is determined in a manner that will become clear below.

The position error signal is transmitted to a proportioning-integrating controller 64 whose output provides one component, proportional to both the position error signal and the integral thereof, of a correction signal to a summing amplifier 66 during operation of the servo circuit 10 in the track following mode. An electronic switch 68, controlled by the microprocessor 48 is closed during such operation, and for a reason to become clear below, opened during a seek operation from one track to another. The position error signal from the demodulator 46 is also transmitted to a differentiator 70 which continually provides a signal corresponding to the actual radial velocity of the head 28 across the surface 18 to the summing amplifier 66 to modify the basic proportioning control scheme of operation of the circuit 10 during track following and to effect seeks from one track to another in a manner to be described below.

In addition to the signals received from the controller 64 and differentiator 70, the summing amplifier 66 receives a velocity demand signal utilized in effecting seeks from the microprocessor 48 via a latch 72 and a D/A converter 74. The velocity demand signal is received at a resistor 76 and, additionally, at an electronic switch 78 and series resistor 80, in parallel with the resistor 76, so that the gain of the summing amplifier 66, with respect to the velocity demand signal can be varied by opening the switch 78, for low gain, or closing the switch 78, for high gain, via a signal provided by the microprocessor 48.

The summing amplifier 66 is comprised of an operational amplifier 82 having a feedback resistor 84 connected between the output of the operational amplifier 82 and the inverting input thereof to fix, in combination with the resistors 76 and 80 and resistors 86 and 87, the gains of the signals received by the amplifier 66. The noninverting input of the operational amplifier 82 is connected to the servo ground. The output of the summing amplifier 66 is provided to the input of a transconductance power amplifier 88 which drives a current through the coil 36 of the actuator 32 in proportion to the output signal received from the summing amplifier 66.

Finally, the circuit 10 is comprised of a comparator 90 that receives the servo ground at its noninverting input and the signal from the D/A converter 74 to permit measurement of the servo ground as part of the start up routine of the data storage device containing the servo circuit 10. To this end, the microprocessor is programmed to output a succession of digitally expressed numbers, during start up, that correspond to different velocities to be demanded of the head 28 during a seek while monitoring the output of the comparator 90 on a conducting path 92. The D/A converter 74 converts these numbers, referred to hereinafter as D/A values, to electrical signals having voltages, with respect to the system ground, proportional to the number in the latch 72. The voltage level of the servo ground is selected so that a digitally expressed number substantially at the midpoint of the range expressible in the latch 72 will, in view of the connection of the noninverting input of the operational amplifier 82 of the summing amplifier 66 to the servo ground, represent a zero demand velocity for the head 28 across the surface 18. Higher numbers in the latch 72 will result in a velocity demand signal to the amplifier 66 tending to drive the head 28 in one direction across the surface 18 and lower numbers will result in a velocity demand signal tending to drive the head in the opposite direction across the surface 18.

VELOCITY DEMAND PROFILE

Figure 2:
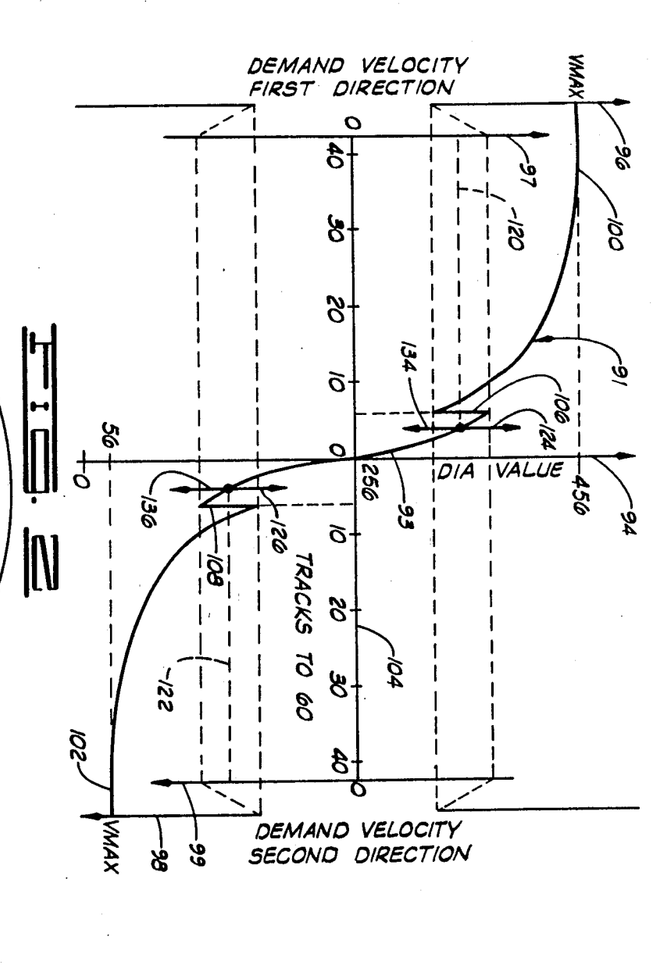
FIG. 2 is a graph of a velocity demand profile stored in the microprocessor of FIG. 1 for effecting seeks to a destination track illustrating the method of determining a velocity increment to be added to the profile for a selected zone.

FIG. 2 illustrates a typical velocity demand profile, generally indicated by the reference numeral 91 and stored in a look up table in the microprocessor 48, by means of which the servo circuit moves the head 28 from one track to another track; that is, to a destination track represented by the central vertical axis 94 of FIG. 2. Such movements are effected by outputting a succession of demand velocities, expressed as D/A values shown on the axis 94, to the latch 72 for conversion to an analog signal by the D/A converter 74 and transmission to the summing amplifier 66 as discussed above. As noted above, a D/A value larger than the servo ground will cause the summing amplifier to provide a signal to the power amplifier that tends to cause the head to be moved in one direction while a D/A value smaller than the servo ground tends to cause the head to move in the opposite direction so that outputting the profile velocities on a tracks to go basis measured from the destination track will tend to move the head 28 across the surface 18 in a direction toward the destination track. For purposes of illustration, it will be assumed herein that movement of the head 28 in a first direction toward the outer edge of the disk 12 is occasioned by increasing the D/A value outputted to the latch 72 while decreased D/A values result in movement of the head 28 in a second direction away from the outer edge of the disk.

In order to use such D/A values, the values are correlated with velocities the head 28 is to have across the disk in physical units, such as inches per second, and additional vertical axes 96 and 97, indicating demand velocities in physical units, for movement in the first direction, have been included in FIG. 2 and axes 98 and 99 have similarly been included for the second direction to provide a bases for a discussion of the correlation.

Initially, it is noted that the velocity demand profile, in physical velocity units versus number of tracks to go in making a seek to a selected destination track, can be obtained for purposes of the present invention in any conventional manner so that only a qualitative discussion of the manner in which the profile is obtained will suffice for the present disclosure. In general, the velocity demand profile is obtained by modeling the mechanical and electrical properties of the rotating disk data storage device and selecting velocities for the profile that will cause the head to have an initial high acceleration toward the destination track followed by a period, for long seeks, in which the head has a selected constant maximum speed that is indicated by flat portions 100 and 102 of the profile. In a final portion of the seek, demand velocities are steadily decreased to cause a controlled deceleration of head 28 that will cause the head 28 to enter the fine control region about the destination track with a speed that will facilitate rapid settling of the head onto the destination track after a transition to the track following mode of operation of the servo circuit 10. Seeks are then effected via the comparison of the demand velocity that is continually updated at the latch 72 and the actual velocity of the head 28 that is generated by the differentiator 70. (The switch 68 is opened during seeks so that the current through the coil 36 is proportional solely to the difference in actual and demand velocities of the head 28. Following the transition to fine control, occurring a selected time after entry of the head 28 into the control region about the destination track, the switch 68 is closed and the D/A value in the latch 72 is set to a zero demand velocity or, preferably, to a position feed forward value as described in U.S. Ser. No. 336,753 entitled Method and Apparatus for Minimizing Settle Time in Servo Systems for Following Magnetically Recorded Tracks in Rotating Disk Data Storage Device filed Jun. 14, 1989, now abandoned, by Robert D. Murphy and Stephen R. Genheimer.)

In order to correlate demand velocities in physical units to demand velocities in D/A values, D/A values are selected for the maximum speed to be demanded of the head across the disk in both directions; for example, if the latch 72 is a nine bit latch and the servo ground is at a level 256, the maximum speed D/A values might be chosen as 56 for maximum speed movement of the head in the second direction and 456 for maximum speed movement in the first direction The microprocessor is programmed to transmit each of these D/A values to the latch 72 as part of the start up routine for the circuit 10 and measure the actual velocity that each D/A value will produce by counting track crossing signals received by the counter 60 of the microprocessor 48 for a selected time interval. The gain of the AGC circuit 42 is adjusted in consecutive high speed sweeps until the velocity so determined for the selected D/A values is substantially the maximum velocity, in either direction, the head is to achieve in a seek. The signal transmitted from the microprocessor 48 to the AGC circuit 44 during these high speed sweeps will be referred to herein as the average AGC signal for the circuit 10. Thereafter, in accordance with the teachings of the prior art, seeks are made by outputting D/A values to the latch 72 and D/A converter 74 in accordance with the stored velocity demand profile that has been illustrated in FIG. 2 while the switch 68 is held open by the microprocessor 48.

Before proceeding, it will be useful to note the characteristics of the stored velocity demand profile established in this manner. Initially, the profile is symmetric with respect to both direction of movement of the head 28 and D/A values measured from the servo ground level as indicated by the horizontal axis 104. Thus, during seeks in accordance with the prior art, the microprocessor 48 calls for demand velocities without regard to effects which might vary appropriate AGC levels across the disk and without regard to forces on the actuator 32 in addition to the Lorentz force on the coil 36 produced by passing therethrough a current from the amplifier 88. Since the actual velocity of the head 28 is determined from signals that have passed through the AGC circuit 44, an inappropriate AGC level, obtained as described above, can cause the head 28 to enter the control region about the destination track represented by the axis 94 with an actual velocity that is higher or lower than the velocity indicated by the velocity demand profile. In the first case, excessive overshoot of the track can occur with the result that the head must be pulled back to the track by the controller 64 and differentiator 70 after a transition to track following has been effected by closing the switch 68. In the second case, undershoot of the track will occur so that the controller 64 and differentiator 70 must pull the head to the destination track after the transition has occurred. In either case, reading or writing to a data track (not shown), aligned with the destination track but on a separate disk surface, must be delayed until settling of the head 28 on the destination track has occurred. Similarly, forces on the actuator 32 can cause the actual velocity of the head 28 to fail to follow the demand velocity because of inappropriate correction signals from the summing amplifier 66 to the power amplifier 88. That is, the model used to derive the velocity demand profile is inapplicable where these forces are not taken into account. As a result, the velocity of the head 28 at the time of entry into the fine control region about the destination track to be followed may be too large or too small for the head to be optimally brought into alignment with the destination track following the transition to the track following mode of operation of the circuit 10. Again, the result is excessive overshoot or undershoot that will require an excessive delay in reading or writing to the destination track caused by a need for the head 28 to be brought substantially into radial alignment with the destination track prior to writing data thereon or reading data therefrom.

A second feature of the velocity demand profile is the presence of discontinuities 106 and 108 near the destination track. (For clarity of illustration, the velocity demand profile 91 has not been drawn to scale. Thus, for example, the velocity of the head 28 at the discontinuities 106 and 108 is typically about two percent of the maximum velocity during a seek.) In the preferred mode of performing a seek, it is desired that the gain of the summing amplifier 66 with respect to the demand velocity be high at large distances from the destination track to insure that the signals from the amplifier 66 will have a sufficient magnitude to cause the head 28 to rapidly reach the maximum speed the head is to have during a seek. On the other hand, resolution of demand velocities becomes more important near the destination track to permit fine adjustment of the speed of the head 28 as it nears the track. Both of these considerations are met by changing the gain of the amplifier 66, with respect to the demand velocity received from the microprocessor 48, as the head 28 approaches the destination track. High gain, in initial portions of the seek, is effected by closing the switch 78 during initial portions of the seek, to place the resistors 76 and 80 in parallel. Since the gain of a summing amplifier, for each signal to be added, is the ratio of the feedback resistance; i.e., the resistance of resistor 84, to the resistance through which such signal is introduced into the noninverting input of the operational amplifier 82, the parallel connection of resistors 76 and 80 increases the gain of the amplifier 66 with respect to the demand velocity. Correspondingly, opening the switch 78 near the destination track reduces the gain of the amplifier 66 with respect to the demand velocity. Such gain transition for the summing amplifier can conveniently be selected to occur at; for example, six tracks to go in the execution of a seek. The axes 96 and 98 indicate the demand velocity in physical units for portions of the velocity demand profile that are implemented at high summing amplifier gain and the axes 97 and 99 indicate the demand velocity in physical units for a central portion 93 of the velocity demand profile that is implemented at low summing amplifier gain.

ADAPTIVE AGC GAIN COMPENSATION

As noted above, one aspect of the present invention is to adaptively adjust the gain of the servo circuit 10 to insure that the AGC level utilized during seeks will cause the actual velocity of the head 28 to follow the demand velocity for portions of a seek near the destination track. To this end, the tracks on the surface 18 of the disk 12 are each assigned to one of a plurality of concentric zones that have been indicated at 110, 112, 114, 116, and 118 in FIG. 3. (For clarity of illustration, only five zones have been shown in FIG. 3.) An AGC level, that will insure that actual and demand velocities having the same value will result in substantially equal inputs to the summing amplifier 66 from the differentiator 70 and D/A converter 74 is then determined for each zone as will now be described.

As part of the start up routine programmed into the microprocessor 48, the head 28 is moved consecutively to each zone and, while the head is in each zone, low speed sweeps are made in both directions across the disk for a selected demand velocity, taken from the velocity demand profile, that has been indicated by dashed line 120 in FIG. 2, for a sweep in the first direction and by dashed line 122 for a sweep in the second direction. Such sweeps are effected by entering the D/A value corresponding to the selected profile velocity in the latch 72 after disabling summing of the output of the controller 64 in the signal sent to the power amplifier 88 by opening the switch 68. During each of these sweeps the counter 60 counts track crossings for a selected time period so that the actual velocity of the sweep is, in effect, measured for both sweeps, such velocity being directly proportional to the number of tracks that are crossed. The microcomputer is programmed to compare the average of these actual velocities to the value of the selected velocity taken from the velocity demand profile and, if the average of the actual velocities is lower than the selected velocity, increment the AGC signal supplied to the AGC circuit 42 via the latch 47 and D/A converter 49. If the average of the actual velocities exceeds the selected demand velocity, the AGC signal supplied to the AGC is decremented. Such adjustments of the AGC signal are continued until the average of the actual velocities is substantially equal to the selected demand velocity. The increment or decrement that has this result is then saved in RAM (not shown) that provides a memory for the microprocessor 48 as an AGC correction signal for the zone. Thereafter, each time a seek to a track in a selected zone is made, the AGC signal supplied to the AGC circuit 42 is adjusted to the sum of the average AGC reference signal and correction signal that has been so determined.

As noted, the sweeps utilized to determine the AGC correction signals are preferably made at low speed as has been stated above. The purpose of selecting a low speed for these sweeps is to insure that the AGC compensation is effected for actual head velocities near the termination of a seek. As will be clear to those skilled in the art, mismatches between the actual head velocity and demand velocities taken from the profile will have the greatest effect on the velocity with which the head enters the control region about a destination track and will accordingly cause the greatest risk of overshoot or undershoot of the destination track. For purposes of this disclosure the term "low speed" can be defined, for the case in which a gain change is made for the summing amplifier 66 during a seek, as a speed taken from the low gain portion 93 of the profile 91. In the absence of such a gain change, useful criteria are a speed no greater than ten inches per second or a speed corresponding to a number of tracks to go not exceeding ten.

VELOCITY DEMAND PROFILE COMPENSATION

While the adaptive AGC gain compensation can be used by itself to effect more rapid track settling characteristics for the magnetic head 28 following a seek to a selected track, it is preferable to use it in conjunction with velocity demand profile compensation selected to adjust at least central portions of the velocity demand profile in a manner that will compensate for forces, such as windage and flex forces, that are exerted on the actuator 32 in addition to the Lorentz force provided by passing a current through the coil 36. Thus, it is specifically contemplated that the adaptive AGC gain compensation of the present invention will be used in combination with the continuously adaptive velocity feed forward compensation that has been disclosed in U.S. Ser. No. 07/516,294 entitled "Hard Disk Drive Adaptation based on Approach Time Measurement" filed by Glenn D. Albert on even date herewith. Alternatively, the present invention contemplates velocity demand profile compensation as part of the start up routines of the data storage device including the servo circuit 10 in accordance with the method now to be described.

Figure 3:
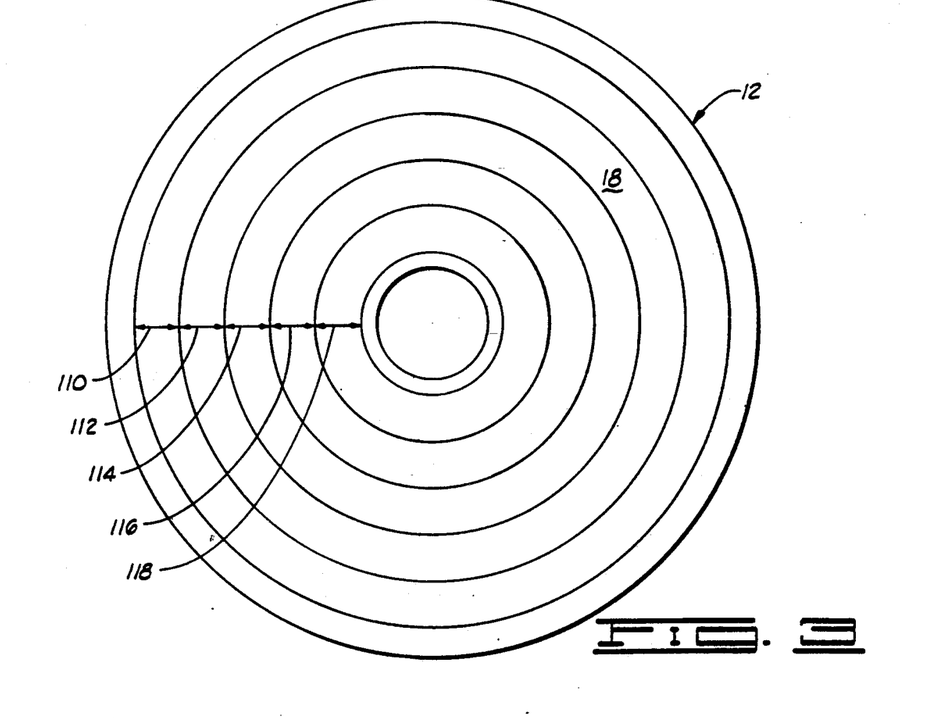
FIG. 3 illustrates the zoning of the servo surface of the disk shown in FIG. 1.

As in the case of AGC compensation, the surface 18 of the disk 12 is zoned and each track on the disk is assigned to a selected zone. Preferably, such zones are the same zones for which AGC compensation is effected. Once such assignment has been made, the magnetic head 28 is moved consecutively to each zone and, while the head 28 is in each zone, a velocity increment is determined in a manner similar to the manner in which the AGC correction signal is determined as described above. In particular, and as illustrated in FIG. 3, a velocity corresponding to the dashed lines 120 and 122, for opposite directions of movement of the servo head 28, is selected for making low speed sweeps, as defined above, in both directions in the zone. Such sweeps are then effected by entering the D/A value corresponding to the selected profile velocity in the latch 72 after disabling summing of the output of the controller 64 in the signal sent to the power amplifier 88 by opening the switch 68. During such sweeps, the actual velocity of the head 28 across the disk surface 18 is measured in the same manner that has been described above for AGC compensation and the microcomputer 46 is programmed to compare the actual velocities s measured during the sweeps. If the actual velocity for the sweep in the first direction is lower than the actual velocity in the second direction, as will often occur for zones near the edge of the disk 12, an increment is added to the velocity taken from the velocity demand profile, by incrementing the D/A value for the profile velocity, for a second sweep in the first direction and the same increment is similarly subtracted from the velocity taken from the velocity demand profile for a second sweep in the second direction. The sweeps are then repeated, with the new velocities, as represented by the new D/A values, and the actual velocities for the sweeps are again compared. Incrementing of the velocity for a sweep in the first direction while decrementing the velocity for sweeps in the second direction is further repeated until the actual velocities are substantially the same for the sweeps in the two directions; i.e., until the velocities are equal within the resolution of the actual velocity measurements. The velocity increments that will have this result, for each zone, are then stored in RAM associated with the microprocessor 48 for use in the manner that has been indicated in FIGS. 2 and 4.

Figure 4:
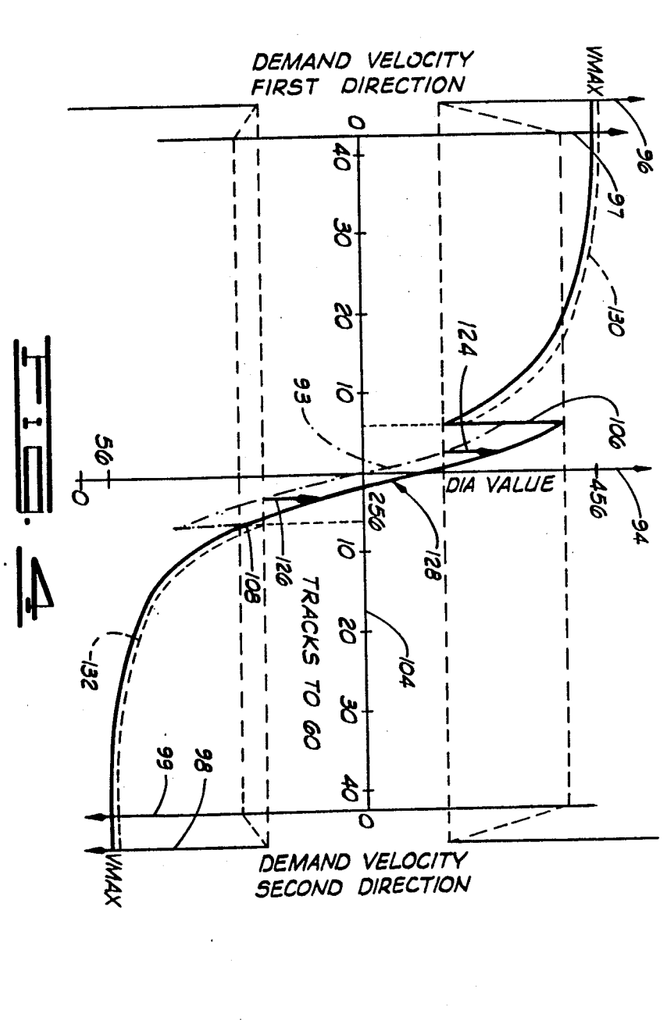
FIG. 4 is a compensated velocity demand profile for a zone near the outside edge of the disk.

In FIG. 2, the increment that will cause the low speed sweeps to be the same, for the case in which the actual velocity is initially higher in the second direction, for a selected zone has been indicated, for both sweep directions, by arrows 124 and 126. As shown in FIG. 4, central portion 93 of the velocity demand profile, corresponding to the portion at which seeks are effected at a low gain for the demand velocity component of signals supplied to the summing amplifier 66, are shifted toward higher D/A values by an amount equal to the stored increment to provide a compensated velocity demand profile that has been indicated generally at 128. Thereafter, all seeks to a track in each zone are made in accordance with the compensated velocity demand profile for that zone.

As in the case with the AGC compensation, the sweeps used to determine the increments are made at low speed as defined above and the use of low speeds for these sweeps has the same purpose that has been described above; that is, to compensate velocity demand profiles for terminal portions of a seek in which velocities for the head 28 that are too high or too low will incur the greatest risk of overshoot or undershoot of the destination track by the head 28. However, it is contemplated that the compensated velocity demand profile may be generated for all values of tracks to go for a seek. In this case, the increment determined for a zone will be added to the profile for seeks in the first direction and subtracted for seeks in the second direction between the discontinuities 106 and 108 while an adjusted increment will be added or subtracted, as appropriate, to the profile for portions of the profile to either side of the discontinuities. Such adjusted increments are derived from the increments 124 and 126 by dividing the increments 124, 126 by the ratio of the gain of the amplifier 66, with respect to demand velocities, at the higher gain to the gain of the amplifier 66 at the lower gain selected therefore. In such case, the compensated velocity demand profile will differ from the profile 128 as shown in dashed lines at 130 and 132 in FIG. 4.

Figure 5:
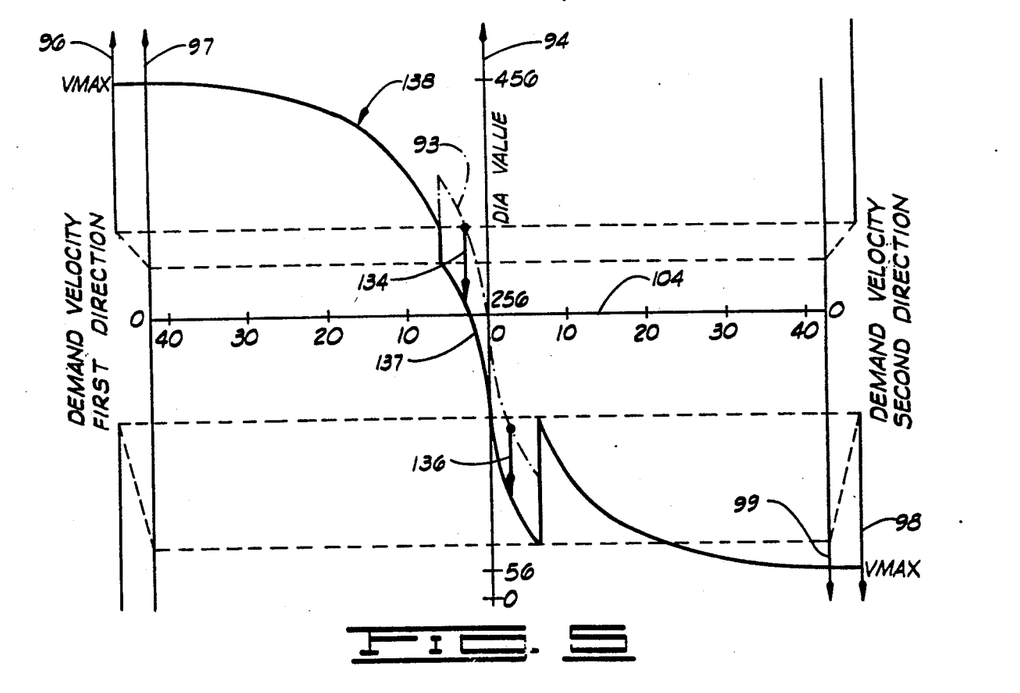
FIG. 5 is a compensated velocity demand profile for a zone near the spindle whereon the disk is mounted.

In the case in which the velocities indicated by the lines 120 and 122 in FIG. 3 cause, for a selected zone, the actual velocity for outwardly directed sweeps to exceed the actual velocity for inwardly directed sweeps, a case that is probable for zones near the spindle 14, increments are added to the velocity indicated by the lines 120, 122 for subsequent sweeps in the second direction and subtracted for subsequent sweeps in the first direction to determine equal increments indicated by arrows 134 and 136 in FIG. 2. These increments are stored and seeks to all tracks in the zone for which the increments 134 and 136 are determined are thereafter made in accordance with a compensated profile 138 shown in FIG. 5. As shown therein, the compensated velocity demand profile is found by shifting D/A values for the central portion 93 of the profile 91 to lower values indicated at 137 by the amount of the increment 134, 136 so determined. As in the case described above, compensation can also be effected for all tracks to go values that might occur in a seek and such compensation is carried out in the manner that has been described above.

In the situation in which both the described AGC compensation and the described velocity demand profile compensation of the present invention are used together, it will be useful to generate both the velocity increments and the AGC correction signals for each zone before moving to the next zone and, further, to do so in the order of velocity increment followed by AGC correction signal. In this case, the actual velocity for oppositely directed sweeps during the AGC compensation will be equal, and equal to the average of such velocities, so that only one sweep will be required for each correction to the AGC reference signal.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for optimizing seeks by a magnetic head to a selected track on a rotating disk of a hard disk drive having a servo system that effects the seeks in accordance with a comparison of the actual head velocities with demand velocities of a velocity demand profile, wherein the hard disk drive is characterized as having a stored velocity demand profile, comprising the steps of:
    assigning each track on the disk to one of a plurality of concentric zones on the disk;
    for each zone on the disk, determining a velocity increment that will cause the head to have the same actual velocity for both directions of movement of the head across the disk when said increment is added to a demand velocity selected from the stored velocity demand profile for movement of the head in one direction across the disk and subtracted from the same selected demand velocity for movement of the head in the opposite direction across the disk;
    storing the velocity increments; and
    thereafter effecting all seeks in said one direction to a track in a selected zone in accordance with a compensated velocity demand profile derived from the stored velocity demand profile by adding the velocity increment for that zone to selected portions of the stored velocity demand profile and effecting all seeks in said opposite direction in accordance with a compensated velocity demand profile derived from the stored velocity demand profile by subtracting the velocity increment for that zone from the same selected portions of the stored velocity demand profile.

2. The method of claim 1 wherein the servo system is characterized as comprising AGC means, responsive to an AGC signal, for providing an adjustable servo gain for the servo system with respect to actual velocities of the head across the disk and wherein the method further comprises the steps of:
    for each zone on the disk, determining a zone AGC signal that will cause the actual velocity of the magnetic head for movement of the head within the zone to be equal to the said selected demand velocity;
    storing indications of the zone AGC signals; and
    thereafter, for each seek to a selected data track in a selected zone, supplying the zone AGC signal for the selected zone to the AGC means.

3. The method of claim 2 wherein the servo system is further characterized as having summing amplifier means for comparing signals indicative of actual and demand velocities for the head during a seek, wherein the summing amplifier means is characterized as having an adjustable gain with respect to the signal indicative of the demand velocity; wherein the gain of the summing amplifier means with respect to the signal indicative of the demand velocity is changed during seeks at a preselected distance, corresponding to a selected demand velocity, from each destination track; and wherein the demand velocity selected for determining the zone AGC signal and velocity increment is less than the demand velocity at which the gain change occurs.

4. The method of claim 2 wherein the demand velocity selected for determining the zone AGC signal and the velocity increment is less than the velocity on the stored velocity demand profile for a distance of less than ten tracks from a selected destination track to which a seek is made.

5. The method of claim 2 wherein the demand velocity selected for determining the zone AGC signals and the velocity increment is less than ten inches per second.

6. The method of claim 1 wherein the servo system is further characterized as having summing amplifier means for comparing signals indicative of actual and demand velocities for the head during a seek; wherein the gain of the summing amplifier means with respect to the signal indicative of the demand velocity is changed at a preselected distance, corresponding to a selected demand velocity, from each destination track; and wherein the demand velocity selected for determining the velocity increment is less than the demand velocity at which the gain change occurs.

7. The method of claim 1 wherein the demand velocity selected for determining the velocity increment is less than the velocity on the stored velocity demand profile for a distance of less than ten tracks from a selected destination track to which a seek is made.

8. The method of claim 1 wherein the demand velocity selected for determining the velocity increment is less than ten inches per second.

9. A method for optimizing seeks by a magnetic head to a selected track on a rotating disk of a hard disk drive having a servo system that effects the seeks in accordance with a comparison of the actual head velocities with demand velocities of a velocity demand profile, wherein the servo system is characterized as comprising AGC means, responsive to an AGC signal, for providing an adjustable servo gain for the servo system with respect to actual velocities of the head across the disk, and wherein the hard disk drive is characterized as having a stored velocity demand profile, comprising the steps of:
    assigning each track on the disk to one of a plurality of concentric zones on the disk;
    for each zone on the disk, determining a zone AGC signal that will cause the average of the actual velocities of the magnetic head for movement of the head within the zone in opposite directions to be equal to a demand velocity selected from the stored velocity demand profile;

storing indications of the zone AGC signals; and thereafter, for each seek to a selected data track in a selected zone, supplying the zone AGC signal for the selected zone to the AGC means.

10. The method of claim 9 wherein the servo system is further characterized as having summing amplifier means for comparing signals indicative of actual and demand velocities for the head during a seek, wherein the summing amplifier means is characterized as having an adjustable gain with respect to the signal indicative of the demand velocity; wherein the gain of the summing amplifier means with respect to the signal indicative of the demand velocity is changed during seeks at a preselected distance from each destination track; and wherein the demand velocity selected for determining the zone AGC signal is less than the velocity demand profile velocity at which the gain change occurs.

11. The method of claim 10 wherein the demand velocity selected for determining the zone AGC signal is less than the velocity on the stored velocity demand profile for a distance of less than ten tracks from a selected destination track to which a seek is made.

12. The method of claim 10 wherein the demand velocity selected for determining the zone AGC signal is less than ten inches per second.

13. In a disc drive having an actuator operable in response to a signal to accelerate and decelerate a transducer, the method of compensating said signal for offset comprising:

operating said actuator in a manner designed to move said transducer at a preselected speed in a first direction;

operating said actuator in a manner designed to move said transducer at the same speed in a second direction opposite the first direction;

determining first and second actual speeds at which said transducer moves in said respective first and second directions; and altering said signal to compensate for said offset if said first and second actual speeds differ by more than a predetermined amount.

14. The method of claim 13 wherein said actuator is operated to move said transducer for a predetermined time interval, and said first and second actual speeds are determined by determining first and second distances in which said transducer moves during the predetermined time interval.

* * * * *